Patented Feb. 29, 1944

2,342,933

UNITED STATES PATENT OFFICE 2,342,933

MANUFACTURE OF BRAKE LININGS

Rudolph A. Goepfrich, South Bend, Ind., assignor to Bendix Aviation Corporation, South Bend, Ind., a corporation of Delaware Application March 21, 1940, Serial No. 325,153

2 Claims. (Cl. 18—47.5)

This invention relates to the manufacture of brake linings or the like, suitable for example for facing brake shoes.

An object of the invention is to provide a lining for a brake shoe, having different characteristics at its opposite ends, for example being harder and slower-wearing at one end than at the other. Such a lining section can be used, in some cases, to compensate for uneven wear of the shoe.

Figure 1:
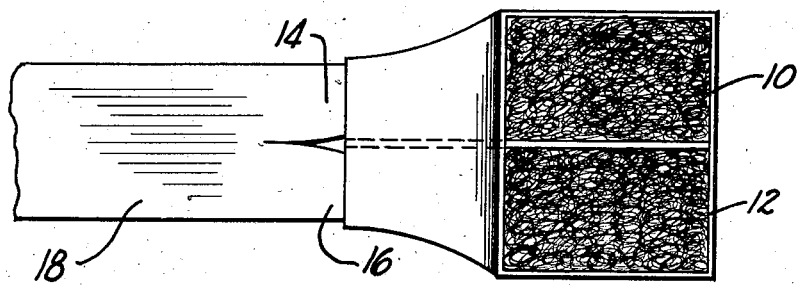
Figure 2:
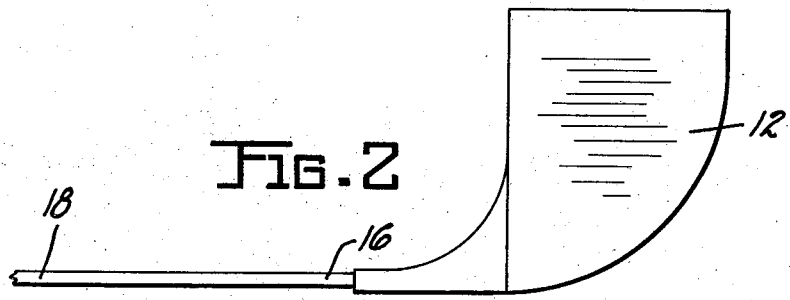
Figure 3:
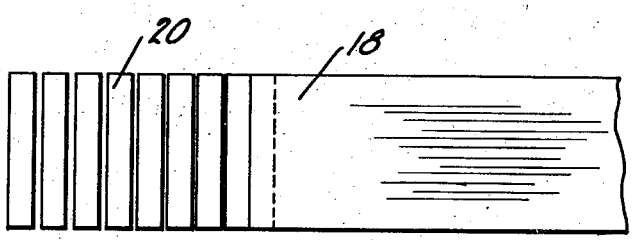

The above and other objects and features of the invention will be apparent from the following description of the accompanying drawing, in which:

Figures 1 and 2 are diagrammatic plan and elevational views of lining being manufactured according to my novel manufacturing method; and Figure 3 is a diagrammatic plan view showing the cutting of my novel lining sections.

My novel manufacturing method may be carried out in a standard extruding machine having two hoppers 10 and 12 containing material for the manufacture of brake lining.

One hopper contains material of a formula giving a hard, long-wearing lining, as for example:

| | | |
|---|---|---|
| Rubber | pounds | 40 |
| Sulphur | ounces | 13 |
| Altax | do | 13 |
| Tuads | do | 9 |
| "Age Rite" | do | 13 |
| Litharge | pounds | 10 |
| Zinc oxide | do | 6 |
| Iron oxide | do | 14 |
| Graphite | do | 10 |
| Barytes | do | 10 |
| Carbon black | do | 20 |
| Asbestos fiber | do | 122 |
| Solvent | do | 150 |
| | | 385 |

The other hopper contains material of a formula giving a soft lining having the characteristic of wearing faster, for example:

| | | |
|---|---|---|
| Rubber | pounds | 40 |
| Sulphur | ounces | 13 |
| Altax | do | 13 |
| Tuads | do | 9 |
| "Age Rite" | do | 13 |

| | | |
|---|---|---|
| Iron oxide | pounds | 42 |
| Barytes | do | 42 |
| Mineral rubber | do | 6 |
| Asbestos fiber | do | 133 |
| Solvent | do | 122 |
| | | 385 |

The material is extruded under pressure, in the usual manner, to form ribbons 14 and 16, side by side, and while still plastic these ribbons are pressed sidewise together in any desired manner to cause them to join edge to edge to form a single ribbon 18 having a width equal to the length of the sections to be formed.

Sections 20 are then cut crosswise from the ribbon 18, and are formed and cured under heat and pressure in the usual way.

This gives lining sections having the desired different characteristics at their opposite ends.

While particular formulas have been given, it is not my intention to limit the scope of the invention to those formulas, or otherwise than by the terms of the appended claims.

I claim:

1. That method of making brake linings or the like comprising forming side by side two ribbons of lining material of different characteristics, joining said ribbons edge to edge to form a single strip having a width equal to the desired length of the finished brake lining, and then severing lining sections transversely of the joined ribbons at intervals equal to the desired width of the finished brake lining, each section thereby being of different characteristics at its opposite ends.

2. That method of making brake linings or the like comprising forming side by side two ribbons of lining material, one of a formula to give relatively long wear and the other of a formula giving shorter wear, joining said ribbons edge to edge to form a single strip having a width equal to the desired length of the finished brake lining, and then severing lining sections transversely of the joined ribbons at intervals equal to the desired width of the finished brake lining, each section thereby being of different wear characteristics at its opposite ends.

RUDOLPH A. GOEPFRICH.